Nov. 12, 1963          R. L. EARLY          3,110,400
MULTIPLE STATION ARTICLE INSPECTING APPARATUS
Filed Dec. 30, 1960                    3 Sheets-Sheet 1

INVENTOR.
RICHARD L. EARLY
BY
J. R. Nelson
and W. A. Schisch
ATTORNEY

Nov. 12, 1963 R. L. EARLY 3,110,400
MULTIPLE STATION ARTICLE INSPECTING APPARATUS
Filed Dec. 30, 1960 3 Sheets-Sheet 2
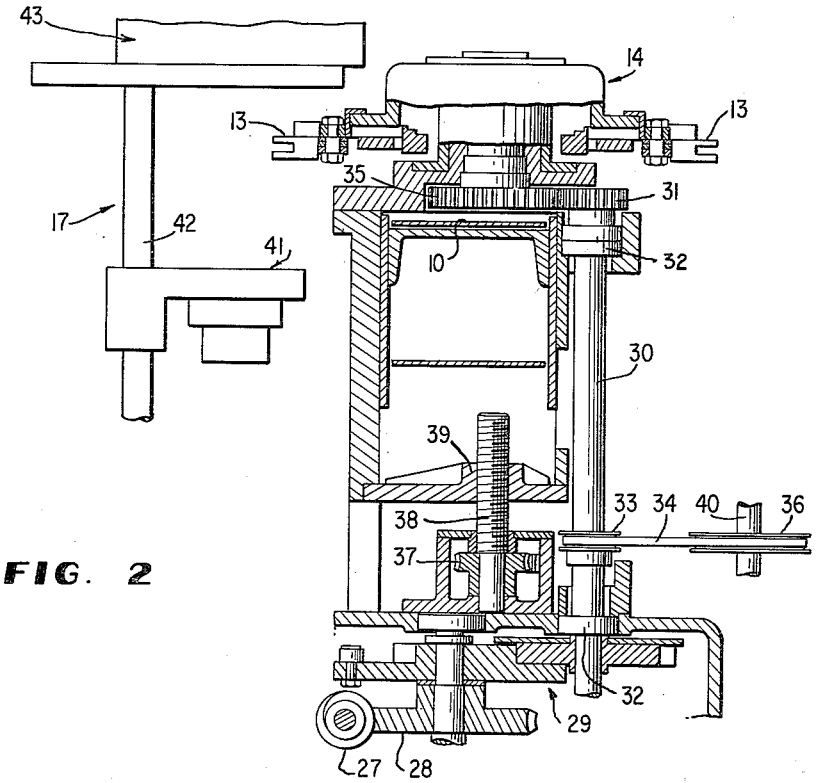
FIG. 2
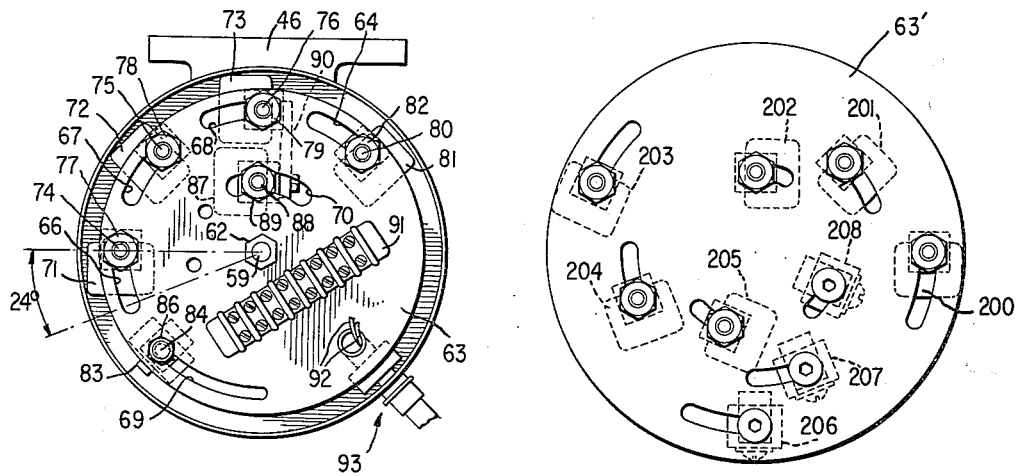
FIG. 4
FIG. 4a
INVENTOR.
RICHARD L. EARLY
BY
ATTORNEY Nov. 12, 1963  R. L. EARLY  3,110,400
MULTIPLE STATION ARTICLE INSPECTING APPARATUS
Filed Dec. 30, 1960  3 Sheets-Sheet 3
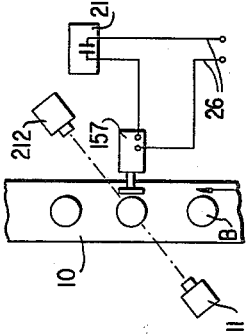
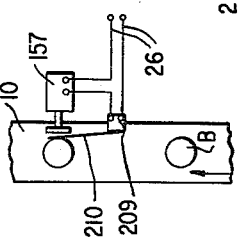
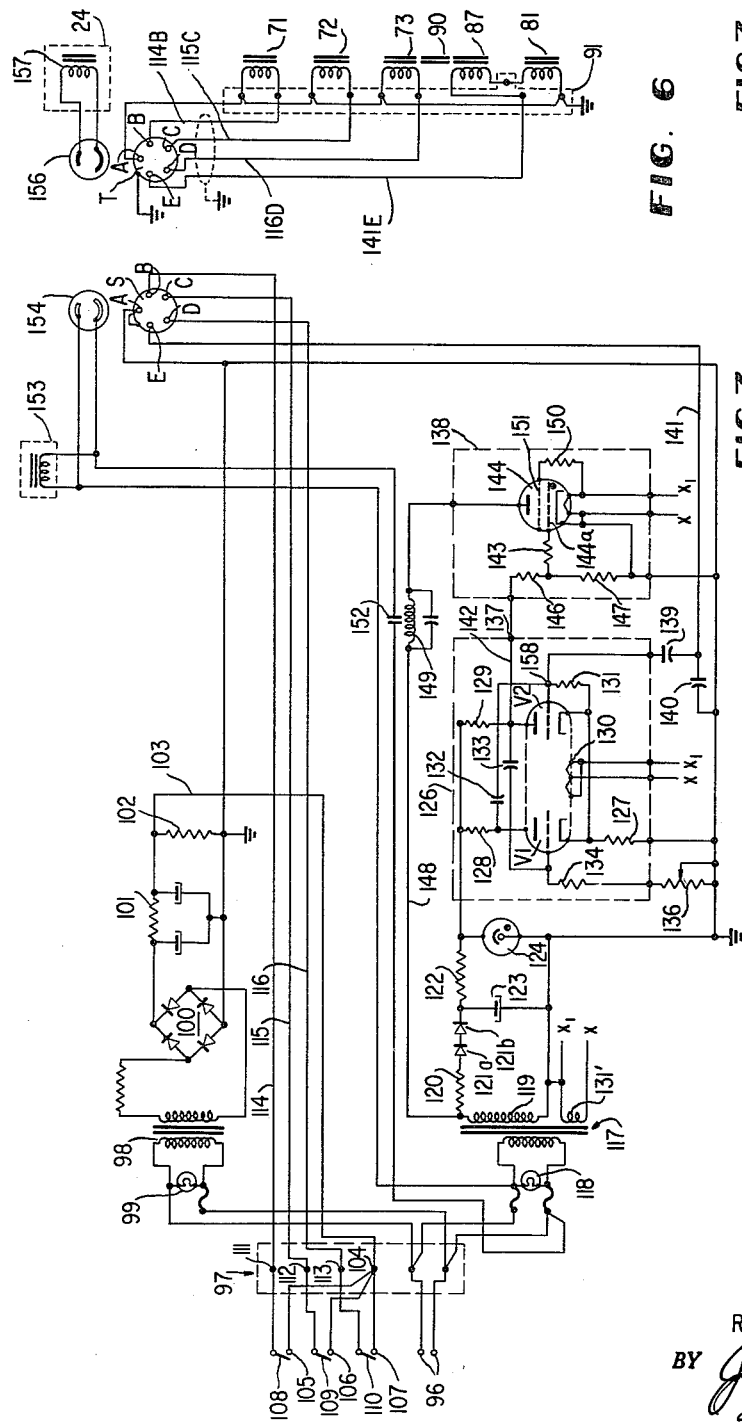
INVENTOR.
RICHARD L. EARLY
BY J. R. Nelson
and W. A. Schurle
ATTORNEY

United States Patent Office 3,110,400
Patented Nov. 12, 1963

3,110,400
MULTIPLE STATION ARTICLE INSPECTING
APPARATUS
Richard L. Early, Toledo, Ohio, assignor to Owens-
Illinois Glass Company, a corporation of Ohio
Filed Dec. 30, 1960, Ser. No. 79,618
11 Claims. (Cl. 209—74)

This invention relates to multiple station article inspecting apparatus and, more particularly, to such apparatus having magnetic memory means for magnetically storing information as to defective articles until such articles have passed the inspecting apparatus and reach the point where they are to be sorted out.

Any article inspecting apparatus which moves an article successively through more than one inspection station will normally be provided either with a reject mechanism at or after each station, or with one or more reject mechanisms located downstream from all of the inspecting stations. It is usually more economical to use the latter arrangement. When downstream rejection is employed, some sort of memory system must be used to record the fact that an article has been found defective at any one of the inspection stations, and such recorded information must be taken out of the memory system and used to control the reject mechanism when the defective article reaches the point where it is to be sorted out.

It is known to use memory units per se with multiple station, or single station, article inspection as, for example, electro-mechanical devices employing disks carrying pins, latches, or the like, which are moved to a position indicating that a defective article is moving through the inspection stations. However, since such electro-mechanical devices are subject to mechanical wear and tear, they tend to give trouble in service and this affects their reliability as well as increasing maintenance costs. Magnetic memory devices have also been employed in connection with bottle inspection apparatus. However, such magnetic devices are rather large units which involve complicated electronic circuits and mechanical assemblies which make their cost prohibitive and their use impractical with smaller article inspection machines.

It is therefore an object of the present invention to provide a new and improved multiple station article inspection apparatus having a memory device associated therewith which is essentially trouble-free and reliable.

It is another object of the present invention to provide such an apparatus wherein the memory device includes magnetic memory means.

It is a further object of the present invention to provide such an apparatus which includes a magnetic memory system which is relatively small and economical compared to known magnetic memory systems for use with such apparatus.

It is still another object of the present invention to provide such an apparatus having magnetic memory means in which false reject signals are effectively prevented from occurring.

Briefly described, a preferred embodiment of the present invention comprises a bottle inspection apparatus wherein individual bottles pass through successive inspection stations, and are then carried past at least one reject station before leaving the apparatus. A memory unit is located adjacent the inspection stations and includes a magnetizable member, such as a hardened steel disk, which is driven in synchronism with passage of the bottles through the inspection stations. The memory unit also includes a plurality of write heads, there being one write head for each inspection station and the arrangement being such that the write head associated with a particular station will be energized to alter the magnetization of the disk surface if the particular station senses a defect in the bottle being inspected at that station.

The memory unit further includes a read head which senses or "reads" any discrete area on the surface of the hardened steel disk which has had its magnetization altered by a write head. The read head is operatively associated with a reject apparatus, and the arrangement is such that each time the read head senses or "reads" a discrete area of altered magnetization, the read head emits a signal which is fed into electrical circuitry associated with the reject apparatus and triggers such circuitry into operation to actuate a reject solenoid which removes the defective bottle from the line. After each discrete area of altered magnetization is read, the discrete area passes under an erase head which restores the area to the magnetization which it had prior to passing under the write heads. Also, in order to prevent energization of the write head located nearest the read head from causing the latter to produce a false signal, means are operatively associated with said nearest write head to neutralize the read head when said nearest write head is energized.

In a modification of the above described embodiment of the present invention, bottles are rejected according to the particular defect sensed at the various inspection stations, rather than all being rejected at one reject station. This is accomplished by providing a number of reject stations equal to the number of inspection stations, and a number of read heads equal to the number of write heads. The arrangement is such that if a write head operatively associated with a particular inspection station is energized, then the read head associated with that write head will read the discrete area on the disk which has had its magnetization altered by the write head, and the read head will produce a signal which ultimately causes the rejection station which corresponds to that particular inspection station to reject a bottle. Thus, the bottle is rejected for the particular defect sensed at the particular inspection station involved.

Other objects and advantages of the present invention will become more apparent from the following detailed description taken in conjunction with the attached drawings in which:

FIG. 2 is an elevational view, partly in cross-section, showing a portion of the turret driving mechanism of FIG. 1 and the driving connection to the memory unit for synchronizing operation of the memory unit with operation of the turret mechanism;

FIG. 3 is a cross-sectional view of the memory unit;

FIG. 4 is a plan view of the magnetic memory unit with the protecting cover removed;

FIG. 4a is a modification showing the mounting arrangement for the read and write heads when it is desired to sort defective articles according to defect;

FIG. 5 is a wiring diagram for the reject control circuit;

FIG. 6 is a wiring diagram for the read and write heads of the memory unit and the reject mechanism; and FIGS. 7 and 7a show "no bottle" disabling arrangements for use with a modification of the invention.

Figure 1:
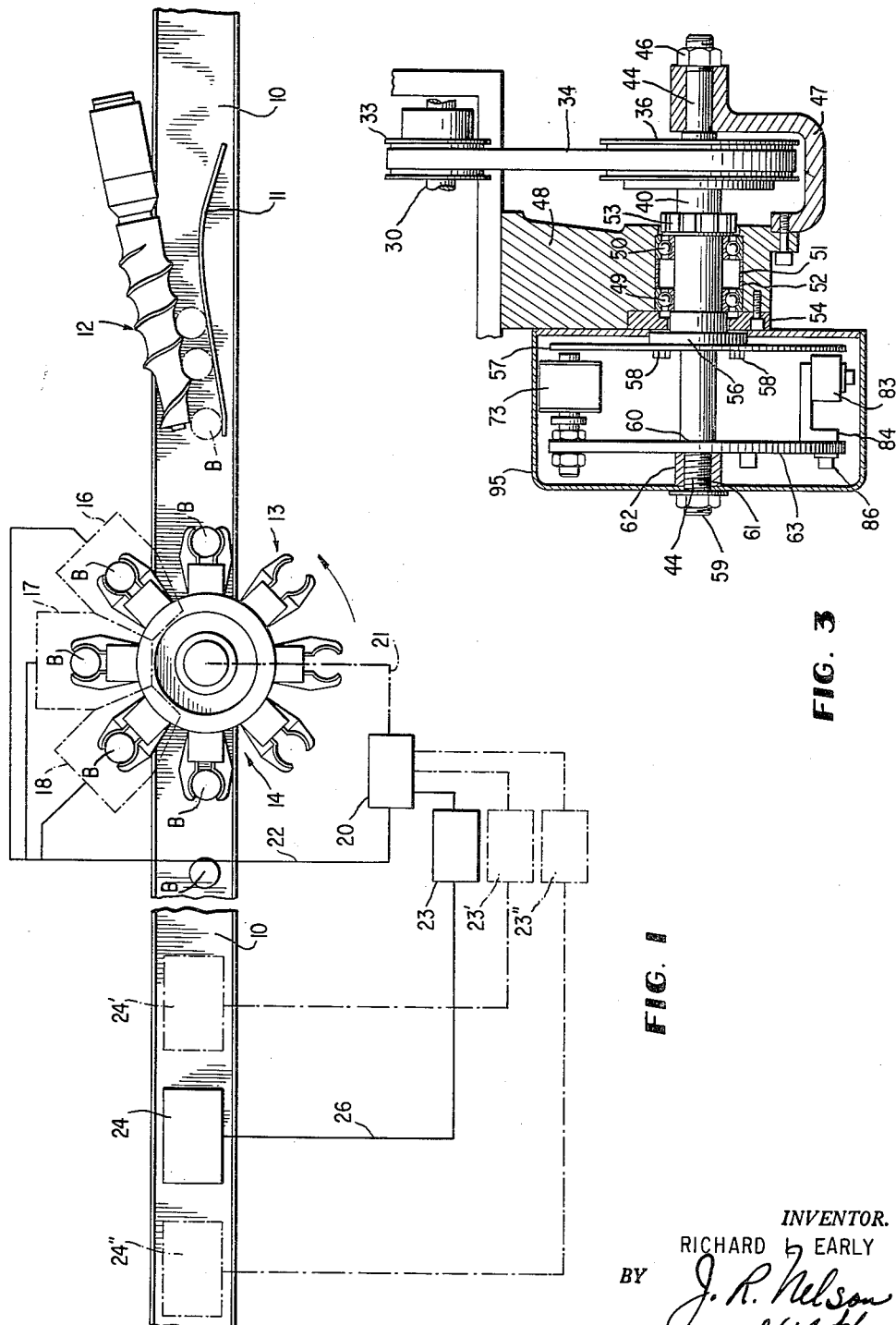
FIG. 1 is a diagrammatic plan view of an apparatus embodying the principles of my invention and designed for handling bottles, jars, or like articles.

Referring now to FIG. 1 of the drawings, an endless conveyer 10 moves the articles B, which may be bottles or jars, along a path through a spacing mechanism comprising guide plate 11 and spacing screw 12 to a turret or carriage mechanism 14 having gripping jaws 13 which are automatically opened and closed as the turret 14 is indexed. Jaws 13 are opened and closed so as to receive the articles B as they are delivered in spaced relation by the spacer screw 12 and guide plate 11. This type of turret mechanism is more fully disclosed in United States Letters Patent 2,371,748, assigned to the assignee of the present invention.

A plurality of test stations, designated by the reference numerals 16, 17 and 18, are equally spaced at 45° intervals with respect to turret 14. As turret 14 is indexed, or moved intermittently in a counterclockwise direction, bottles are tested in sequence at stations 16, 17, and 18 for defects such as wrong height, wrong width, etc. When a defect is found, such defect causes a switch to be closed at the testing stations where the defect is found, and the closing of the switch completes a circuit to a magnetic memory unit designated generally by the reference numeral 20.

Magnetic memory unit 20 includes a magnetizable disk, referred to in greater detail later, which is driven intermittently and in synchronism with the driving of turret 14 by means of a timing belt shown as a dotted connection 21 (see FIG. 1). Each testing station is associated with a defect recording means for altering the magnetization of a discrete area on the magnetizable disk of magnetic memory unit 20 to indicate a defective article. A read head, referred to in greater detail later, reads each altered magnetized area and, when the read head does read or sense such an area, it produces a voltage pulse which actuates or energizes a reject control circuit, indicated by box 23 shown in FIG. 1. Reject control circuit 23 is connected by lead 26 to a reject mechanism, indicated by box 24 shown in FIG. 1, which is located along the path where articles are moved by conveyer 10 so that, in the event one of the inspecting stations locates or determines that a defective bottle is moving along the path, such information is stored in the magnetic memory unit for subsequent use in actuating the reject mechanism whenever the article is at the reject position.

Referring to FIG. 2, the driving arrangement for turret 14 is shown as including a worm 27, which may be synchronized with the drive for conveyer 10, and which drives worm gear 28. Carried on the same shaft as worm gear 28 is a Geneva mechanism 29 including a driver which engages radial guideways (not shown) in a disk carried on a driven shaft 30. Geneva mechanism 29, which is of conventional construction and is described more fully in the above-mentioned Patent 2,371,748, indexes, or intermittently drives shaft 30 which is supported by bearings 32 at the top and bottom thereof. One end of shaft 32 carries a gear 31 which is meshed with another gear 35 carried on a center post (not shown) of the turret mechanism so that the gripping jaws 13 of turret 14 are indexed therewith. The turret itself may be adjusted in elevation with respect to conveyer 10 by means of a worm 37 geared to a worm screw carried on a crank shaft (not shown). A screw 38 on the shaft of worm gear 37 is threadedly engaged with the turret frame at 39 so that whenever worm gear 37 is turned in any direction, the elevation of the turret relative to conveyer 10 is varied.

A pulley 33 carried on shaft 30 has trained thereabout a timing belt 34 which belt is also trained about a pulley 36 carried on a timing shaft 40. As Geneva mechanism 29 indexes turret 14, a bottle carried by gripping jaws 13 is moved through test stations 16, 17 and 18 and, at each test station, a different test is performed on the bottle. At each test station, gripping jaws 13 release the bottle to a pad 41 carried on a bracket which is elevated along vertical post 42 to a gauging or testing head 43. Testing station 17, indicated generally in FIG. 2, is shown in outline form and a more detailed description and operation of such a station may be found in the gauging machine disclosed in United States Letters Patent 2,327,629, assigned to the assignee of the present invention, and the article handling apparatus disclosed in the above mentioned Patent 2,371,748. Such article handling apparatus and gauging machine disclosed in these two patents form, per se, no part of the present invention.

Referring now to FIGS. 3 and 4, the magnetic memory unit 20 of the present invention is shown as including a fixed spindle 44 secured by a nut 46 in a spindle housing 47. Spindle housing 47 is secured to a mounting bracket 48 which is secured to and extends from the frame of the machine. A pair of roller bearings 49 and 50 separated by a spacer 51 are mounted in a bore 52 through the bracket 48. The bearings are held in place by a lock nut and washer 53 and a bearing pin cap 54.

Roller bearings 49 and 50 support a hollow timing shaft 40 on one end of which is secured a pulley 36. On the other end of timing shaft 40 is a hub 56 rigidly secured thereto and rotatable therewith. A hardened steel disk 57 is secured, by nuts 58, to hub 56 so that, through hollow shaft 40, pulley 36, turning belt 34, and pulley 33, disk 57 is indexed in exact synchronism with the bottle turret. Therefore, when the bottle under inspection is at an inspection station, disk 57 is stationary. However, the disk advances an angular distance corresponding to the angular spacing between the inspection stations each time the bottle is advanced from one inspection station to the next inspection station or is released back on the conveyer 10.

The left end 59 (as seen in FIG. 3) of fixed spindle 44 is reduced in diameter to form a shoulder 60, the reduced diameter portion having threads 61 for receiving a spacer nut 62. Spacer nut 62 secures a head plate 63 against shoulder 60 of fixed spindle 44.

Head plate 63 has formed therein a plurality of arcuate slots 64, 66, 67, 68, 69 and 70 (see FIG. 4). Write heads 71, 72 and 73, associated with inspection stations 16, 17 and 18, respectively, are carried by adjusting studs 74, 75 and 76, respectively, passing through slots 66, 67 and 68 respectively. Adjusting nuts 77, 78 and 79 secure the adjusting studs, and the write heads carried thereby, at any position in slots 66, 67 and 68, respectively, so that adjustment of the position of the write heads may be carried out without any difficulty. A similar adjusting stud 80 passing through arcuate slot 64 carries a read head or coil 81 and is secured in different positions in slot 64 by adjusting nut 82.

An erase magnet 83 is adjustably carried in arcuate slot 69 by an adjusting stud 84 secured by adjusting nut 86.

The support arrangement described above for the write heads, the read head, and the erase magnet positions these devices with respect to magnetizable disk 57 so that there is a very small air gap (.005 inch, for example) between the magnetic cores of the read and write heads and the magnetizable disk 57.

It will be noted that write head 73 is in rather close proximity to read head 81 so that there is a possibility that when a current is passed through write head 73 the magnetic flux which it produces may induce a false voltage in read head 81 and a premature reject signal will be transmitted to the reject mechanism. In order to eliminate such a spurious reject signal, a neutralizing coil 87, carried on an adjusting stud 88 passing through arcuate slot 70 and secured to head plate 63 by an adjusting nut 89, is magnetically coupled to write head 73 by a magnetic shorting bar or shunt 90. Electrically, neutralizing coil 87 is connected in series opposition to read head 81 so that when current passes through write head 73, approximately equal voltages are induced in neutralizing coil 87 and read head 81. Consequently, the induced voltages cancel each other out and there is no reject signal developed. Read head 81, write heads 71, 72 and 73, and neutralizing coil 87 are connected to a terminal block 91 by leads (not shown). Leads 92 are suitably connected to the terminal blocks and carried out through bushing 93 to the reject control circuit 23 shown as block 21 in FIG. 1 and in detail in FIG. 5. A suitable dust cover 95 encloses the memory unit and is secured on the spindle 44 by a nut.

Taking FIGS. 5 and 6 together, it will be seen that alternating current power is supplied to the circuit through input terminals 96 to a power transformer 98 having a pilot lamp 99 connected across its primary winding. The alternating current on the secondary of transformer 98 is converted to direct current by a full wave bridge rectifier 100, filtered by a filter network 101, and appears across bleed resistor 102. This direct current voltage is carried by lead 103 to terminal 104 of terminal strip 97.

Contacts 105, 106 and 107 of defect switches 108, 109 and 110, respectively, therefore have direct current voltages supplied thereto. Switches 108, 109 and 110 are located at inspection stations 16, 17 and 18, respectively, any of which may be closed when a defect, determined by that inspecting station, is located in a bottle. Closure of switch 108, 109 or 110 completes a circuit through terminal 111, 112 or 113 to lead 114, 115 or 116, respectively. These leads are connected to pins B, C and D, respectively, of socket connector S which mates with socket connector T to connect leads 114, 115 and 116 to leads 114b, 115c and 116d. Leads 114b, 115c and 116d connect to one side of write heads 71, 72 and 73 respectively, the other side of the write coils being commonly connected to ground.

Alternating current from terminals 96 is also supplied to primary winding of transformer 117, pilot light 118 indicating that transformer 117 is energized. The voltage on the secondary of transformer 117 is rectified by a pair of selenium rectifiers 121a and 121b which have in series therewith dropping resistors 120 and 122. A filtering capacitor 123 is connected across the rectifier output and a voltage regulator tube 124 maintains the voltage at a predetermined value.

Monostable multivibrator circuit 126 includes a duo-triode vacuum tube having tube sides V1 and V2. The cathodes of V1 and V2 are connected through a common cathode resistance 127 to ground while the plates of V1 and V2 are connected through resistances 128 and 129, respectively, to the source of regulated D.C. voltage. Filaments 130 of tubes V1 and V2 are connected through leads X, X1 to the filament winding 131' on transformer 117. The grid of V2 is connected through resistor 131 to the cathode of V2 so that tube V2 is initially conducting heavily and the plate voltage is low. The grid of tube V2 is also cross coupled to the plate of tube V1 by capacitor 132. The grid of tube V1 is cross coupled to the plate of tube V2 by timing capacitor 133 and to ground through resistor 134 and potentiometer 136.

With operating potential applied to the monostable multivibrator circuit, and with the grid of tube V2 connected through resistance 131 to the cathode of tube V2, tube V2 is conducting and, due to the drop across the common cathode resistance 127, tube V1 is held cut off. Under this condition, the voltage at output terminal 137 of the monostable multivibrator circuit is of an insufficient magnitude to cause triggering of the switch device shown in block 138.

The grid of tube V2 is coupled through a capacitor 139, forming with capacitor 140 a capacitance voltage divider, and lead 141 to pin E of socket connector S. When socket connector S and socket connector T are mated together, lead 141 is connected to lead 141E and the read head 81 through the neutralizing coil 87.

Whenever a magnetized area of steel disk 57 induces a voltage in read head 81 a trigger voltage, or pulse, is applied via lead 141E, lead 141, and coupling capacitor 139, to the grid of tube V2. The polarity of the voltage induced in read head 81 is such as to apply a negative pulse of voltage to the control grid of tube V2. A negative voltage applied to the grid of tube V2 causes this tube to cease conduction so that the voltage at the plate of this tube increases very rapidly. This voltage is applied through lead 142 to output terminal 137.

A voltage divider comprising resistors 146 and 147 is connected across the output terminals of the multivibrator circuit, and the junction of these two resistors is connected through current limiting resistor 143 to the grid of thyratron tube 144. Alternating current potential from the secondary of transformer 117 is applied through lead 148 and relay coil 149 to the plate of thyratron tube 144. Alternating current is also applied to the filament of thyratron tube 144, through terminals X, X1 from the filament winding 131' of transformer 117. One side of the filament of tube 144 is connected through a resistor 150 to grid 151 of thyratron tube 144 and the other side of the filament is directly connected to the cathode of the thyratron. The alternating current voltage applied to the heater is so phased that, when the alternating current voltage applied to the plate of this tube is positive with respect to the cathode, the alternating current voltage applied to shield grid 151 is negative with respect to the cathode. Therefore, normally, thyratron tube 144 is cut off or non-conductive when the potential applied to the control grid 144a connected at the right-hand side of resistance 143 is below the firing point of this tube. It should be understood that a positive voltage on the control grid is required to fire a thyratron when the shield grid is biased sufficiently negative. The magnitude of the positive voltage required increases as the negative bias is increased.

Relay 149 has a set of normally open contacts 152 for controlling power from the alternating current input to reject mechanism 24 and a reject counter 153. Female receptacle 154 is adapted to receive a plug 156 connected by cable 26 to reject solenoid 157 of reject mechanism 24.

The operation of this circuit is as follows:

When a magnetized area on disk 57 is indexed past the read head or coil 81, a voltage is generated which is applied through lead 141E, socket connectors T and S, lead 141, and coupling capacitor 139 to the input terminal 158 of monostable multivibrator circuit 126. As mentioned earlier, this multivibrator circuit is constructed so that tube V2 is normally conducting, and the plate voltage thereof will be rather low and of insufficient magnitude to trigger the thyratron circuit 138.

However, when the voltage induced in the read head 81 is applied to the grid of tube V2, and is negative, the plate current through the tube decreases and the plate voltage rises rapidly so that, in effect, the negative signal applied to terminal 158 is amplified. This voltage is applied through cross coupling capacitor 133 to the grid of tube V1 which will start to conduct and its plate voltage will decrease in a negative direction. This negative going voltage is coupled through capacitor 132 to the grid of tube V2 to cause less current to flow through tube V2 and, accordingly, its plate voltage increases proportionately. This action takes place substantially instantaneously through the multivibrator action described above and results in the tube V2 being completely cut off and tube V1 conducting.

The multivibrator circuit is now in its quasi-stable state. The duration or period of time that the multivibrator circuit stays in its quasi-stable state is largely determined by the value of resistance in the circuit, as determined by the setting of potentiometer 136. Capacitor 133 is charging to the voltage on the plate of tube V2 through potentiometer 136. As the charge on capacitor 133 increases, the charging current decreases and the plate voltage on tube V1 gradually rises. The current flowing through resistor 131 causes a voltage drop which holds tube V2 cut off. The current through resistor 131 is caused by the discharge of capacitor 132 which is discharging toward the plate voltage on tube V1, since the plate voltage on tube V1 is lower when it conducts. The current flowing through resistor 131 is influenced both by the magnitude of the original voltage drop at the plate of tube V1 and the rate at which the voltage on the plate of tube V1 is rising. As noted earlier, the current through tube V1 is controlled by the potentiometer 136 and the charging of capacitor 133. When the voltage drop across resistor 131 reaches the cut-off value of tube V2, this tube starts to conduct again and the multivibrator circuit returns to its stable state. The circuit remains in this condition until another defect signal arrives from the read head.

Whenever the monostable multivibrator circuit is shifted to its quasi-stable state, the voltage on the plate of tube V2 rises in a positive direction. This positive rise in potential is taken from output terminal 137 and applied across voltage dividers 146 and 147, through resistor 133, to the control grid 144A of thyratron tube 144. This magnitude of positive potential on the grid of thyratron 144 renders this tube conductive for a period of time which is determined by the time duration of the quasi-stable state of the monostable multivibrator. The relay 149 in the plate circuti of thyratron 144 is energized to close contacts 152 which completes an alternating current circuit through counter 153 and reject solenoid 157 in the reject mechanism 24 to remove an article found defective by any one of the testing stations 16, 17 and 18.

Write heads 71, 72 and 73 disclosed in FIG. 4 are disposed at the same radial distance from the axial center of the magnetic memory disk so that as a bottle is indexed through the inspection stations 16, 17 and 18 all defects are recorded on the disk at substantially the same area. This is because when, for example, inspection station 16 locates a defective bottle, and causes a magnetic spot to be produced on the disk, this particular magnetic spot is indexed with the bottle to a position under the next write head. Should station 17 find another defect in the bottle, this would cause write head 72 to magnetize a portion of the disk so as to have a magnetic spot thereon. However, since inspection station 16 has already caused a portion or area of the disk to be magnetized, and that area is underneath the write head 72, there will only be a further magnetization of that particular area. Under these conditions, the magnetic disk will only have one magnetic spot recorded thereon for each defective bottle no matter how many defects are located in it.

FIG. 4a discloses a magnetic memory recording arrangement for multiple reject stations where the radius of the write heads with respect to the center of the disk is different and each write head has an individual read head associated therewith, along with a reject mechanism located downstream from the inspection apparatus. Thus, head plate 63' adjustably carries three write heads 200, 201 and 202 which are located on different radii thereof. On the same radius as each of the write heads 200, 201 and 202 there is a read head 203, 204 and 205, respectively, each adjustably mounted in the head plate 63' like the read and write heads shown in FIG. 4. Also, each read head has an erase magnet associated therewith which, likewise, is adjustably positioned at the same radius on the head plate as are the associated write heads. These erase magnets 206, 207 and 208, respectively, prepare the magnetizable disk 57 for the next reject signal applied by the associated write heads 200, 201 and 202, respectively.

As shown in dotted lines in FIG. 1, each read head is connected in circuit with a reject control circuit, designated by blocks 23, 23' and 23", and each reject control circuit operates a reject mechanism 24, 24' and 24" all of which are located downstream from the inspection stations. Each of the reject control circuits located within the blocks 23, 23' and 23" is like the reject control circuit disclosed in FIG. 5 and operates in substantially the same manner except that, as is indicated by FIG. 1, should inspection station 16, for example, note a defect in a bottle, and should the succeeding inspection stations detect a defective bottle, the first reject mechanism 24' will be operated so as to remove the defective bottle because of the particular defect detected at station 16. In other words, it is preferred that should the article or bottle inspected at inspection station 16 have a non-standard length, for example, then all of the bottles moved off of the conveyor at reject station 24' will be bottles having non-standard lengths. Similarly, reject station 18 may gauge each of the articles to determine whether they have non-standard diameters and, accordingly, all of the bottles moved off by reject mechanism 24" will have non-standard diameters. Thus, in the arrangement disclosed in FIG. 4a, wherein the read heads, write heads, and erase magents are at different radial distances from the axial center of the memory disk, the defective bottles or articles are moved off the conveyer 10 according to the type of defect which has been detected therein.

It will be apparent that, should a bottle pass through the inspection machine which has more than one defect in it, then the first noted defect will cause that bottle to be moved off of the conveyer before it reaches the reject mechanism under control of one of the later inspection stations where another defect is noted in that particular article. Therefore, the later reject mechanism will be operated even though there is no bottle on the conveyor at that particular reject station. In order to prevent operation of the reject mechanisms at the later stations, I provide a "no bottle" disabling mechanism which may take the form of a micro-switch operated by a bottle traveling on the conveyer, or a photoelectric cell which disables the reject mechanism should there be no bottle on the conveyer at that particular time. These devices are shown in FIGS. 7 and 7a, respectively.

Referring now to FIG. 7, a micro-switch 209, having a bottle actuated arm 210, is connected in series circuit with the reject solenoid 157. Leads 26 are connected to the magnetic memory through receptacle 154 (see FIG. 5).

This "no bottle" disabling arrangement operates as follows:

If a bottle is on conveyer 10 and is moving downstream form the inspection device, this bottle physically moves arm 210 to close micro-switch 209 to complete the circuit to the reject solenoid 157. If that particular bottle had caused a magnetic spot to be impressed on the memory disk 57 then, through the operation of the multivibrator circuit and the thyratron trigger circuit, the reject solenoid will be energized to knock the bottle off of the conveyer. However, should a bottle at that particular location on the conveyer be knocked off by a previously operated reject solenoid, then switch 209 will not be closed by the bottle and the reject solenoid will not be operated.

A similar arrangement is disclosed in FIG. 7a in which a light source 211 projects a beam of light across the path of the bottles moving along conveyer 10 in front of the reject solenoid. A photoelectric cell 212 positioned in the path of the beam has associated therewith a photoelectric relay 213 which is operated when a bottle moving on the conveyer 10 passes between the light source and the photoelectric cell to close the relay. This completes the circuit to the reject solenoid in a similar fashion to the operation of the microswitch 209 as explained in connection with FIG. 7.

From the foregoing detailed description, it will be seen that a multiple station bottle inspection apparatus employing a magnetic memory system according to the present invention has relatively few parts for the reliability of operation obtained. Since the write and read heads do not touch the magnetizable memory disk, these parts are not subject to mechanical wear like that found in apparatus employing conventional mechanical pins or latches in connection with indicating defects. This results in essentially trouble-free operation which minimizes maintenance costs and, since the memory system is relatively small compared to known types of magnetic memory systems heretofore utilized for such purposes, the overall apparatus is relatively economical to install thereby bringing it within reach of users having relatively small bottle inspection requirements.

A feature contributing to the reliability of apparatus according to the present invention is the provision of the neutralizing arrangement described above in connection with the write head located nearest to the read head. As described above, this arrangement effectively prevents false reject signals from being produced by the read head. Another feature which also contributes to reliability of operation is the timing control which is exerted over the monostable multivibrator in its quasi-stable state. As described above, the time during which the thyratron tube conducts is determined by an RC circuit which is located in the cross-coupling circuit of the multivibrator. In other words, the RC circuit determines the duration of the quasi-stable state of the multivibrator which, in turn, determines the duration of conduction of the thyratron.

In the embodiments of my invention which are described above, the magnetic memory or information storage member is shown as being a hardened steel disk. However, it will be apparent to those skilled in the art that this magnetic member may have a geometrical shape other than a disk. For example, the magnetic member could be a magnetizable steel bar which is secured to and is indexed with timing shaft 40.

Accordingly, while I have illustrated and described embodiments of my invention, I wish it to be understood that I do not intend to be restricted solely thereto, but that I do intend to cover all modifications thereof which would be apparent to one skilled in the art, and which come within the spirit and scope of my invention.

I claim:

1. An article inspection apparatus comprising conveyer means for moving articles in succession along a predetermined path, test means located adjacent said path for performing a test on each article to determine if the article is defective, said test means including a testing station and means to index each article from said conveyer means to said testing station and then from said testing station back to said conveyer means for further movement along said predetermined path, reject means located adjacent said path downstream from said test means for removing from said conveyer each article found to be defective by said testing station, magnetic memory means located adjacent said testing station and including a movable member having a magnetizable surface, an electrical write head, an electrical read head, means supporting said movable member with respect to said write and said read heads so that a discrete area on said magnetizable surface first passes in close proximity to said write head and subsequently passes in close proximity to said read head, switch means at said testing station electrically connected in series with said write head, said switch means operable when an article has been found to be defective at said testing station to complete an electrical circuit to said write head, said write head being operable when energized to alter the magnetization of a discrete area on said magnetizable surface, said read head being subsequently operable to sense the altered magnetization of said discrete area and produce an electrical pulse when said sensing occurs, reject control circuitry electrically connected between said read head and said reject means, said reject means being operable in response to actuation of said control circuitry to remove an article from said conveyer means, said control circuitry including means responsive to an electrical pulse produced by said read head to actuate said control circuitry to operate said reject means, means operatively connecting said movable magnetizable surface member with respect to said conveyer means to synchronize movement of said magnetizable surface member with respect to said conveyer means so that said reject control circuitry is actuated to operate said reject means when a defective article has moved downstream to said reject means, a neutralizing coil, means inductively coupling said neutralizing coil to said write head for inducing a voltage in said neutralizing coil when said write head is energized, and means electrically connecting said neutralizing coil in series opposition to said read head whereby any voltage induced in said read head when said write head is energized is substantially neutralized by the voltage simultaneously induced in said neutralizing coil to prevent said read head from giving a false signal when said write head is energized.

2. An article inspection apparatus comprising conveyer means for moving articles in succession along a predetermined path, test means located adjacent said path, said test means including a plurality of testing stations operable to perform a series of different tests on each article, and means to move each article from said conveyer means through said testing stations in succession and then back to said conveyer means, and reject means located downstream from said test means and operable when actuated to remove from said conveyer means each article found to be defective at any of said testing stations, magnetic memory means located adjacent said test means and including a movable magnetizable member, a plurality of electrical write heads corresponding in number to the number of testing stations, an electrical read head, means supporting said movable magnetizable member with respect to said write and read heads so that said member passes in close proximity to said write and read heads, electrical circuit means connected between each testing station and a corresponding write head and including switch means at the testing station operable when an article has been found to be defective at said testing station to complete an electrical circuit to the associated write head, said write head being operable when energized to alter the magnetization of said magnetizable member, said read head being subsequently operable to sense the altered magnetization of said member and produce an electrical pulse when such sensing occurs, reject control circuitry electrically connected between said read head and said reject means, said reject means being operable in response to actuation of said control circuitry to remove an article from said conveyer means, said control circuitry including means responsive to an electrical pulse produced by said read head to actuate said control circuitry to operate said reject means, and means operatively connecting said movable magnetizable member with respect to said conveyer means to synchronize movement of said magnetizable member with respect to said conveyer means so that said reject control circuitry is actuated to operate said reject means when a defective article has moved downstream to said reject means, and irrespective of which testing station has located the defect in said article.

3. An article inspection apparatus according to claim 2 wherein one of said write heads is located nearer to said read head than the other write heads, and including a neutralizing coil inductively coupled to said nearest write head for inducing a voltage in said neutralizing coil when said nearest write head is energized, and means electrically connecting said neutralizing coil in electrical opposition to said read head to neutralize said read head so that it does not produce a false signal when said nearest write head is energized.

4. An article inspection apparatus according to claim 3 wherein said means inductively coupling said neutralizing coil to said nearest write head comprises a bar of magnetizable material extending from said nearest write head to said neutralizing coil.

5. An article inspection apparatus comprising conveyor means for moving articles in succession along a predetermined path, test means located adjacent said path, said test means including a plurality of testing stations operable to perform a series of different tests on each article, and means to index each article from said conveyor means through said testing stations in succession and then back to said conveyor means, reject means located adjacent said path downstream from said test means for removing from said conveyor each article found to be defective at any of said testing stations, magnetic memory means located adjacent said test means and including a movable member having a magnetizable surface, means supporting said member for indexing movement in synchronism with indexing movement of article at said test means, a plurality of write heads corresponding in number to the number of test stations and located in close proximity to said magnetizable surface, each write head being operable when energized to alter the magnetization of a discrete area on said magnetizable surface, electrical circuit means extending between each testing station and its associated write head, said circuit means including switch means at the testing station operable when an article has been found to be defective at said testing station to complete said electrical circuit means to energize the associated write head, a read head, said support means for said magnetizable surface member supporting said member for movement so that any discrete area on said surface which has its magnetization altered by any of said write heads subsequently passes in close proximity to said read head, and said read head being operable to sense any such altered discrete area and produce an electrical pulse, and reject control circuitry electrically connected between said read head and said reject means, said reject means being operable in response to actuation of said control circuitry to remove an article from said conveyor means, said control circuitry including means responsive to an electrical pulse produced by said read head to actuate said control circuitry to operate said reject means, and the location of said read head with respect to said write heads being adjustable so that an altered discrete area can be sensed by said read head at substantially the time when the defective article which caused a write head to alter the magnetization of said discrete area comes within reach of said reject means so that the latter can remove the defective article from the conveyor means.

6. An article inspection apparatus according to claim 5 wherein said test means includes means for adjusting each of said testing stations to accommodate a succeeding series of articles different from the preceding series of articles, said adjustment of said testing stations being possible without requiring adjustment of said magnetic memory means whereby said magnetic memory means is versatile insofar as the different characteristics of the articles being tested are concerned.

7. An article inspection apparatus comprising conveyor means for moving articles in succession along a predetermined path, test means located adjacent said path, said test means including a plurality of testing stations operable to perform a series of different tests on each article, and means to move each article from the conveyor means to said testing stations in succession and back to said conveyor means, and reject means located downstream from said test means and operable when actuated to remove from said conveyor means each article found to be defective at any of said testing stations, magnetic memory means located adjacent said test means and including a movable magnetizable member, a plurality of electrical write heads corresponding in number to the number of testing stations, a corresponding number of electrical read heads, there being a read head operatively associated with each write head, means supporting said movable magnetizable member with respect to said write and read heads so that said member passes in close proximity to said write and read heads, switch means at each testing station operable when an article has been found to be defective at said testing station to complete an electrical circuit to the associated write head, each write head being operable when energized to alter the magnetization of said magnetizable member, the read head associated with each write head being subsequently operable to sense the altered magnetization of said member and produce an electrical pulse when such sensing occurs, reject control circuitry electrically connected between each read head and said reject means, said reject means being operable in response to actuation of said control circuitry to remove an article from said conveyor means, said control circuitry including means responsive to an electrical pulse produced by any of said read heads to actuate said control circuitry to operate said reject means, and means operatively connecting said movable magnetizable member with respect to said conveyor means to synchronize movement of said magnetizable member with respect to said conveyor means so that said reject control circuitry is actuated to operate said reject means when a defective article has moved downstream to said reject means.

8. An article inspection apparatus according to claim 7, characterized by having means for preventing said reject means from operating if the defective article has already been removed from the conveyor means, by a preceding operation of a reject means.

9. An article inspection apparatus according to claim 7 wherein said movable magnetizable member is a metal disk, the respective pairs of associated write and read heads are located at different radial distances from the center of said disk, and each write head and each read head is supported for adjustment along an arc of a circle having the disk center as its center.

10. For use with an article inspection apparatus having conveyor means for moving articles in succession along a predetermined path, a multiple station test means located alongside said path and operable to perform a series of different tests on each article to determine if the article is defective, reject means located downstream from said multiple station test means and operable when actuated to remove from said conveyor means each article found to be defective at any of said test stations, and magnetic memory means including a write head for recording information identifying each defective article found at said testing station, and a read head for reading said information and producing an output pulse; a reject control circuit comprising a monostable multivibrator circuit having one stable and one quasi-stable state, and also having input and output terminals, means electrically connectable between said read head and said input terminals to feed a pulse produced by said read head to said monostable multivibrator circuit, said multivibrator circuit being operable to shift from its stable state to its quasi-stable state when said pulse is fed to said input terminals, a timing circuit electrically connected to said multivibrator circuit for controlling the time duration of said quasi-stable state, and normally open switch means connected to the output terminals of said multivibrator circuit, said switch means being operable to close when said multivibrator circuit shifts to its quasi-stable state, and said switch means remaining closed for a time equal to the time duration of said quasi-stable state.

11. For use with an article inspection apparatus according to claim 10; a reject control circuit wherein said normally open switch means is a normally non-conductive thyratron, said thyratron having a control grid connected to the output terminals of said multivibrator circuit, and said multivibrator circuit producing a signal when it shifts to its quasi-stable state, said signal being applied to said thyratron grid to render said thyratron conductive for a period of time corresponding to the time duration of the quasi-stable state of said multivibrator circuit, and said timing circuit comprises a resistance and a capacitance connected in series and included in a feed back circuit of said multivibrator circuit.

References Cited in the file of this patent

UNITED STATES PATENTS

| | | |
|---|---|---|
| 2,371,748 | Fedorchak | May 20, 1945 |
| 2,848,107 | Juengst | Aug. 19, 1958 |